(12) United States Patent
Miklos et al.

(10) Patent No.: US 7,693,538 B2
(45) Date of Patent: Apr. 6, 2010

(54) FAST HARD HANDOVER SCHEME AND MOBILE STATION AND BASE STATION SUPPORTING SUCH SCHEME

(75) Inventors: Gyorgy Miklos, Budapest (HU); Andras Racz, Budapest (HU)

(73) Assignee: Telefonaktiebolaget L M Ericsson(Publ), Stockholm (SE)

( * ) Notice: Subject to any disclaimer, the term of this patent is extended or adjusted under 35 U.S.C. 154(b) by 451 days.

(21) Appl. No.: 10/597,866

(22) PCT Filed: Feb. 13, 2004

(86) PCT No.: PCT/SE2004/000192

§ 371 (c)(1),
(2), (4) Date: Aug. 10, 2006

(87) PCT Pub. No.: WO2005/079099

PCT Pub. Date: Aug. 25, 2005

(65) Prior Publication Data

US 2007/0178932 A1 Aug. 2, 2007

(51) Int. Cl.
*H04B 7/00* (2006.01)
*H04W 36/00* (2006.01)
*H04W 72/00* (2006.01)
*H04W 74/00* (2006.01)
*H04W 4/00* (2006.01)

(52) U.S. Cl. .............. 455/525; 455/435; 455/450; 455/455; 455/422.1; 455/436; 370/332

(58) Field of Classification Search .......... 455/436, 455/437, 438, 439, 440, 442; 370/331, 350, 370/325, 335, 324, 509, 337, 457, 328, 330, 370/342

See application file for complete search history.

(56) References Cited

U.S. PATENT DOCUMENTS

| 5,502,721 | A  | * | 3/1996  | Pohjakallio    | 370/336 |
|-----------|----|---|---------|----------------|---------|
| 5,722,080 | A  | * | 2/1998  | Kondo          | 455/502 |
| 5,774,814 | A  | * | 6/1998  | Haas           | 455/524 |
| 6,414,947 | B1 | * | 7/2002  | Legg et al.    | 370/331 |
| 6,493,564 | B2 | * | 12/2002 | Longoni et al. | 455/522 |

(Continued)

FOREIGN PATENT DOCUMENTS

EP 1128703 A1 8/2001

(Continued)

*Primary Examiner*—Lester Kincaid
*Assistant Examiner*—Kuo Woo
(74) *Attorney, Agent, or Firm*—Roger S. Burleigh (57) ABSTRACT

The present invention relates to a method, mobile station and base station in a soft handover cellular communications system. A problem addressed is the complexity imposed by a soft handover combination node in the network for combining packets received from one mobile station over parallel diversity links. The combination node is a problem with respect to the network complexity, transmission capacity and retransmission delays. The present invention solves the problem by selecting on a packet-by-packet basis one of an active set base stations for forwarding the packet further uplink. Thereby no combination node in the network is needed. The mobile stations select the base station after transmitting a packet or prior to transmitting it. The selection is based on measures of the radio link qualities made during transmission of the relevant packet or made prior to its transmission.

24 Claims, 5 Drawing Sheets

U.S. PATENT DOCUMENTS

| | | | |
|---|---|---|---|
| 6,542,742 B2 * | 4/2003 | Schramm et al. | 455/436 |
| 6,570,862 B2 * | 5/2003 | Virtanen | 370/335 |
| 2002/0119778 A1 * | 8/2002 | Baker et al. | 455/436 |
| 2003/0142647 A1 | 7/2003 | Agrawal | |
| 2003/0224774 A1 * | 12/2003 | Cheng et al. | 455/422.1 |
| 2004/0109424 A1 | 6/2004 | Chheda | |
| 2004/0219917 A1 * | 11/2004 | Love et al. | 455/436 |

FOREIGN PATENT DOCUMENTS

WO  WO 02073988 A2  9/2002

\* cited by examiner

FAST HARD HANDOVER SCHEME AND MOBILE STATION AND BASE STATION SUPPORTING SUCH SCHEME

TECHNICAL FIELD OF THE INVENTION

The present invention relates to a method in a cellular communications system supporting macro-diversity. It also relates to a mobile terminal and a radio base station for use in such a system.

DESCRIPTION OF RELATED ART

Soft handover is a technique of employing radio links over two or more base stations for communication between a mobile station and the fixed part of a cellular radio network. Soft handover is typically used in DS-CDMA (Direct Sequence Code Division Multiple Access) based cellular systems. In these systems the same radio frequency is used in adjacent cells, which naturally lends itself for exploiting the multiple reception of the mobile stations transmission at adjacent cells for macro diversity.

During soft handover the same radio frame sent by the mobile station MS is received by all base stations involved in the soft handover. In the downlink the same radio frame is sent to the mobile station time synchronized by all base stations. A selection combining point in the network is responsible for selecting one instance of the received radio frame from the ones received by the involved base stations. The group of base stations providing radio links to a specific mobile station is named the active set.

In order for soft handover to provide enough radio capacity gain fast power control is essential. Owing to the fast fluctuating quality on the radio links from a mobile station, which one of the active set base stations that experiences the highest signal power from the mobile station change rapidly. A command to decrease power from any of the base stations will be obeyed by the mobile station whereas it increases its transmit power only if all base stations command power increase. Base stations receiving data from the mobile station when the power is down regulated by another base station, may receive the data corrupted. The combining node in the fixed part of the network receives data from all base stations of an active set and combines it before it is further transmitted.

WCDMA (Wideband CDMA) is based on DS-CDMA technology and standardised by 3GPP. WCDMA systems employ soft handover to increase radio efficiency by using selection diversity in the uplink and maximum ratio combining in the downlink.

During selection combining in the uplink the base stations involved in the soft handover forward the received radio frames to the selection combining point in the network. The selection combiner performs error checking on the received radio frames and selects the one that has been received error-free. It assembles the higher layer packet and forwards it further up in the network. If the received frames are all corrupted the selection combiner requests retransmission from the mobile station.

WO 02/35779 discloses a Selection Diversity Forwarding (SDF) scheme in the context of ad hoc multihop networks. In cellular mobile systems a central node, such as a Radio Network Controller controls the link and the selection of the base stations. A multihop network works on a completely different basis, leaving to the different nodes of the network to decide on in which direction to forward a received packet. Routing tables are used by the nodes when deciding on the direction. The SDF solution, hence, assumes a transmitter node and several potential receiver nodes that can forward the packet of the transmitter to the destination node. The packet sent by the transmitter is received by all the receivers, which send back quality information about the reception and/or any other information, e.g., path length to the destination, queue information, QoS related information, etc., that can influence the decision on which path the packet should be transmitted. The basic idea is to let the transmitter select which receiver should forward the packet further in the network based on the feedback reports sent by the receivers. Multihop networks do not include features for keeping communication over several parallel radio links. Such missing features are for example regulation of the mobile transmit power from several base stations and a network combining node for diversity combining of packets received over parallel links and/or for re-assembling segments into whole packets.

Soft Handover requires that the retransmission protocol and the segmentation and reassembly function should be located above the selection combining node in the network, that is, user plane radio link protocols can not be terminated in the base station. This complicates network architecture and puts extra load and special quality requirements on the transmission network between the base station and the combining point. When the combining point is located up in the network it also introduces additional delays on the retransmission schedules it is in control of. This may be detrimental for services with hard requirements on delays. By segmentation is meant that higher layer packets are fractioned to fit into radio frames when transmitted on the radio link.

U.S. Pat. No. 5,867,791 relates to soft handover with a switching centre as a combining node for uplink data. It further discloses that the combining node selects one of the base stations for forwarding an uplink data block, the selection being based upon quality measures sent from the base stations.

SUMMARY OF THE INVENTION

The problem addressed by the present invention is the cost and complications of diversity combining in the network, while also taking into account the need for preserving the diversity gain affect of soft handover as much as possible.

The present invention solves the problem by a method of radio transmitting a packet from a mobile station to two or more base stations while only one of these base station is selected for forwarding the packet further up in the network. The transmitting mobile station selects the forwarding base station. The selection is made after the transmission of the radio packet and it is based on radio link quality measures received from the base stations after the packet transmission. Alternatively the selection of the radio base station is made before the packet is transmitted based upon predictions of the radio link qualities.

An advantage of the present invention is that it removes the need for having a diversity combining node in the network, and at the same time it maintains similar diversity gain as in case of soft handover.

The invention allows simplification of network architecture by terminating radio link protocols in the base station instead of in the network combining point. The user IP layer can extend down to the base station. The WCDMA base station can be seen from the IP network point of view simply as an IP node that has a wireless interface similarly to e.g., a WLAN access point. The overall system complexity is also decreased.

As a further advantage the load on the transmission network is decreased, since there is no multiple transmission between the base stations and the combining point as it is the case with existing soft handover solutions.

DESCRIPTION OF PREFERRED EMBODIMENTS

The principle idea of the present invention is to let the mobile station MS control the uplink selection combining instead of having a combiner node in the network. There is an active set of base stations in relation to each mobile station, any of which can potentially be selected by the mobile station to be the receiver and forwarder of a given packet. The active set can be maintained similarly as in case of soft handover. That is, base stations can be added, removed and replaced in the active set based on averaged measured path loss values.

The mobile station selects for each data packet one of the base stations from the active set that should forward the packet further up in the network. The mobile station can take into account ARQ (Automatic Repeat Requests) feedbacks in the form of positive or negative acknowledgements, link quality reports and higher layer packet segment boundaries when making the base station selection. There are two main embodiments of the base station selection scheme:

the a priori selection, and
the a posteriori selection.

In the a priori selection the mobile station selects the receiving and forwarding BS prior to sending the packet and it addresses the packet directly to the selected BS. In the a posteriori decision the mobile station selects the forwarding BS after the packet has been sent and ARQ feedback and possibly other link quality reports have been sent back by the base stations. In the first case the decision is based on the future prediction of the link qualities to the different base stations. In the latter case the decision is made based on the actual quality of the reception. By nature, the a posteriori selection always results in better radio efficiency than the a priori selection. The a posteriori selection scheme can achieve the same diversity gain as the original soft handover solution. On the other hand the a posteriori selection adds an additional delay in the communication, which corresponds to the Round Trip Time on the radio link.

The fast hard handover scheme of the present invention is also affected by the length of the packets, the packets may be of a length fitting into a radio frame or it may be longer and then needs to be segmented for fitting into two or more radio frames. After transmission the segments need to be reassembled into the original packet at a network node.

In the further description a priori and a posteriori embodiments of the present invention will be disclosed with specific examples on different sizes of packets that either fit into single radio frames or that need be segmented and reassembled after radio transmission.

The a Posteriori Selection

Figure 1:
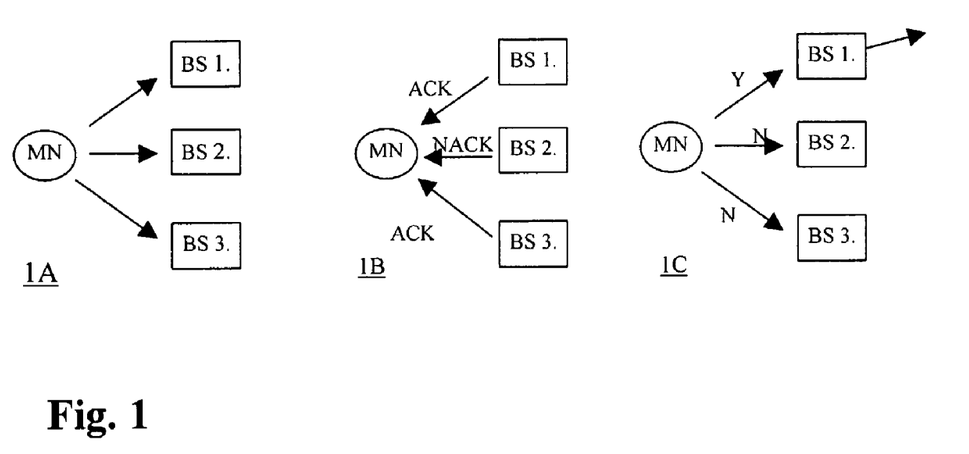
FIG. 1 is 3 box diagrams consecutively disclosing the signals sent between a mobile station and base stations according to the steps 1A-1C of an inventive method.

FIG. 1 is 3 box diagrams disclosing a mobile station MS and an active set of base station BS1-BS3. The diagrams illustrate the transmissions between the mobile station and the active set base stations BS1-BS3 according to an inventive method. In a first step 1A the mobile station MS transmits a packet that is received by the active set base stations BS1-BS3. The higher protocol layer information packet, e.g. an IP protocol layer, is assumed to fit into one radio frame.

In the second step 1B, two of the base stations BS1, BS3 receive the packet correctly and send positive acknowledgement in response to the mobile stations MS, while one of the base stations BS2 receives the packet corrupted and send negative acknowledgement.

In a next step 1C the mobile station MS selects which of the active set base stations BS1-BS3 shall forward the packet in the fixed part of the network. In the example the first base station BS1 is selected and information on the selected base station is sent to the active set base stations BS1-BS3. The first base station BS1 then forwards the packet while the non-selected base stations BS2, BS3 discard the packet. The information on the selected radio base station BS1 is transmitted from the mobile station MS carried piggy-backed in the next radio frame sent e.g., in the header.

The mobile station MS selects the base station BS1 among the base stations BS1, BS3 that have positively acknowledged receipt of the packet. In the example there are two base stations BS1, BS3 to choose among. The selection of any of the two base stations BS1, BS3 can be random or more parameters can be taken into account for the selection. Should any of the two base stations have sent a command to the mobile station MS to decrease its transmit power, this base station should be selected and the power regulated according to its command. Signal to Interference ratios measured by the base stations BS1-BS3 may also be sent to the mobile station MS and used for the selection of forwarding base station BS1.

The acknowledgements sent from the base stations BS1-BS3 in the second step, 1B, should preferably be sent downlink separately from downlink user traffic, possibly on a dedicated control channel.

The steps 1A-1C described above is repeated for each packet sent from the mobile station MS, however, the base stations that positively acknowledge receipt of the packet may vary among the receiver set as well as the selected base station.

Uplink Transmission of Segmented Data Packets

The higher protocol layer data packets may be too large to fit into a radio frame on the radio link. The mobile station MS then needs to segment the packet into two or more segments that each fit into a radio frame. One data packet is then transmitted in two or more subsequent radio frames.

Figure 2:
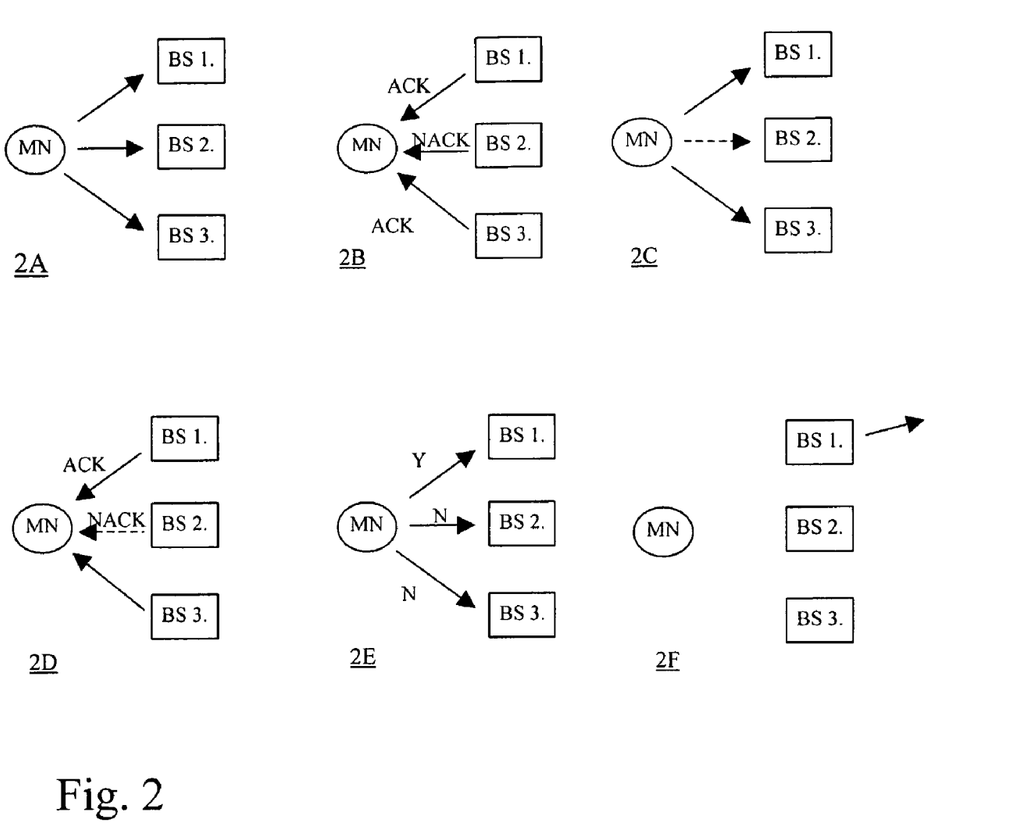
FIG. 2 illustrates signalling steps 2A-2F of an alternative method.

The steps of uplink transmission of a segmented data packet according to the a posteriori selection are illustrated in FIG. 2.

In an initial step 2A the mobile station MS segments the next upper layer packet into segments fitting into radio frames. In the example an upper layer data packet e.g., an IP packet, is segmented into two radio frames. The mobile station MS sends the first radio frame, which carries the first segment of the upper layer packet. This is received by all base stations BS1-BS3 in the active set. The mobile station MS also maintains a so called receiver set of base stations, which is always a subset of the active set. The receiver set includes the base stations that have correctly received all segments of the packet so far. This set is initialized to the active set each time when the transmission of a next packet begins. Once a base station is dropped from the receiver set it cannot be reselected into the set until the set is initialized again. That is, the receiver set is a monotonously decreasing set.

During the transmission the base stations BS1-BS3 send back fast power control commands to the mobile station MS. The power control commands are interpreted in the same way as in the original soft handover scheme. However, the mobile station MS accepts power control commands only from the base station that are part of the receiver set. That is, the mobile station MS increases power if all base stations BS1-BS3 in the receiver set instruct for increase and it decreases power if any of the base stations instructs for decrease.

At the next step 2B the base stations BS1-BS3 send back ARQ feedbacks to the mobile station MS. The base stations BS1-BS3 may also send additional link quality reports e.g., signal to interference ratio (SIR). Note that this ARQ feedback should be sent separately from downlink user traffic, possibly on a dedicated control channel. The mobile station MS updates the receiver set according to the received acknowledgements. If all base stations BS1-BS3 within the receiver set have sent a negative acknowledgement the receiver set will not be changed and the mobile station MS will retransmit the packet. If any of the base stations BS1-BS3 have sent a positive acknowledgement, those base stations BS1, BS3 remain in the receiver set, while others that have sent negative acknowledgement are removed from the receiver set. In the current example the first and third base station BS1, BS3 have sent positive acknowledgements and only the second base station BS2 has sent negative acknowledgement, which means that the second base station BS2 will be removed from the receiver set.

In the following step 2C, the mobile station MS sends the next radio frame, which carries the last segment of the upper layer data packet. This radio frame is destined only to the first and third base station BS1, BS3 although the second base station BS2 may also receive the packet. Alternatively it may switch off its receiver during the data packet transmission but it still needs to receive the control information sent by the mobile station MS.

Next, the first and third base stations BS1, BS3 send ARQ feedbacks to the mobile station MS, see step 2D. In this case only the first base station BS1 has sent positive acknowledgement. The second BS2 may also send acknowledgement but if so this should be ignored since the second base station is no longer part of the receiver set. The mobile station updates the receiver set, which now includes only BS1.

In step 2E that follows, the mobile station MS recognizes that this was the last segment of the upper layer packet. It selects one of the base stations BS1 from the receiver set to be the forwarding node. Note that at this point the receiver set includes those base stations BS1 that have correctly received all segments of the higher layer packet. In this example there is only one such base station BS1, which is the first base station BS1. The mobile station MS signals in the next radio frame which base station has been selected.

In the final step 2F, the first base station BS1 recognizes that it has been selected as the forwarding base station, it assembles the upper layer packet and sends it further up in the network. Other base stations BS2, BS3 that have not been selected discard the data packet.

Segmentation and Reassembly

In the uplink the mobile station MS segments the higher layer packet into radio frames and it continuously maintains which base station BS1-BS3 have received correctly all segments of the higher layer packet so far. As disclosed above the mobile station MS uses the receiver set for this purpose, which is updated based on ARQ feedbacks sent by the base stations BS1-BS3. When the last segment has been transmitted the mobile station MS designates one of the base stations BS1-BS3 from the receiver set to assemble the higher layer packet and to forward it further up in the network.

Alternatively, one of the BSs in the active set can be designated as the reassembling point by the MS. If there are missing segments at the reassembling BS other BSs can forward them to the reassembling point via the fixed network. The reassembling BS may be changed on a packet-by-packet basis. For instance, the MS may designate the BS for reassembling that has the highest number of correctly received segments.

The a Priori Selection

Uplink Transmission for Non-segmented Packets

Figure 3:
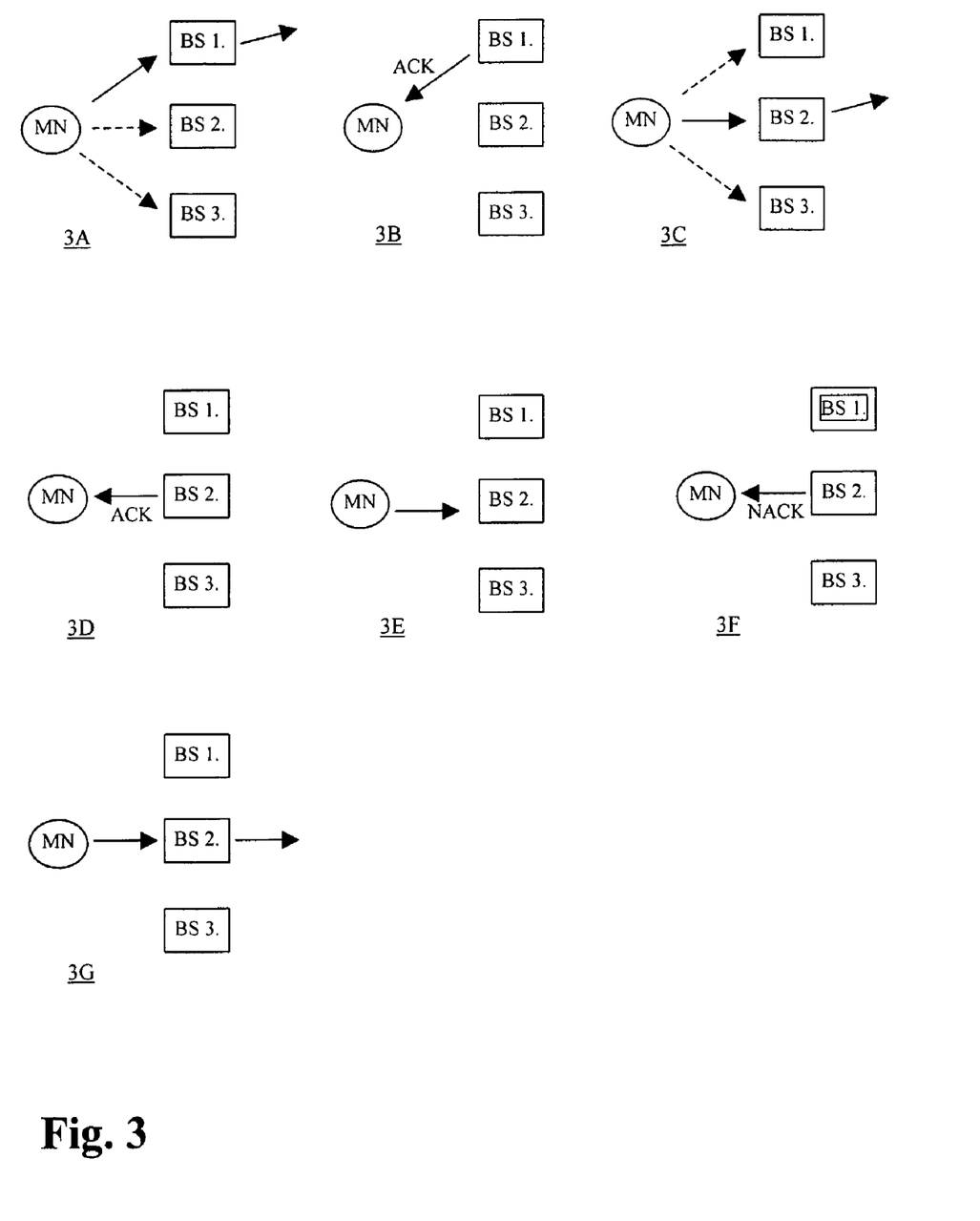
FIG. 3 is block diagrams corresponding to those in FIG. 1 however disclosing the signalling steps 3A-3G of an alternative method.

The steps 3A-3G of a method for transmitting uplink packets to a priori selected base stations will be described with reference to FIG. 3. FIG. 3 is a series of block diagrams of an active set base stations BS1-BS3 and a mobile station MS, in each the signalling of a corresponding method step is illustrated.

It is assumed that the size of data packets on a high protocol layer is short enough to fit into the radio frames of the radio link.

In a first step 3A the packet is sent from the mobile station MS to an addressed first base station BS1 of the active set base stations BS1-BS3. The addressed first base station BS1 forwards the received packet further uplink. Though only the first base station BS1 is addressed the other base stations BS2, BS3 of the active set listen to the packet and send back power control commands. The power control commands are used by the mobile station MS to make the link quality estimates that will be used when deciding which base station BS1-BS3 to select for forwarding the next packet.

In step 3B, the first base station BS1 acknowledge (ACK) receipt of the packet by sending ARQ feedback.

In next step 3C, the second base station BS2 is addressed in the second packet transmitted from the mobile station MS. The second base station BS2 is selected by the mobile station MS because it was the base station commanding for power decrease the most often during the transmission of the previous frame. During the transmission of the next frame the mobile station MS will follow the power control commands of base station BS2 to set its transmit power but it will also monitor the power control commands of the other base stations BS1 and BS3 in order to collect link quality data to be used at the next base station selection.

The second base station BS2 forwards the received data packet further uplink.

In step 3D, the second base station BS2 sends back ARQ feedback to the mobile station. We assume that according to the estimated link quality based on the power control feedbacks sent continuously during the previous packet transmission at step 3C, still base station BS2 has the best radio link quality. Therefore base station BS2 is selected to be the receiver also for the next data packet.

In following step 3E, the mobile station MS transmits the next data packet to the second base station BS2.

The packet is, however, not correctly received by the second base station BS2 and hence, the second base station BS2 sends an negative acknowledgment NACK in response to the mobile station, according to step 3F of FIG. 3.

In reply to the negative acknowledgement, the mobile station MS, retransmit the packet, see step 3G, and when being correctly received the second base station BS2 forwards the packet further uplink.

The transmission of further packets will follow the principles described.

Uplink Transmission for Segmented Packets

Figure 4:
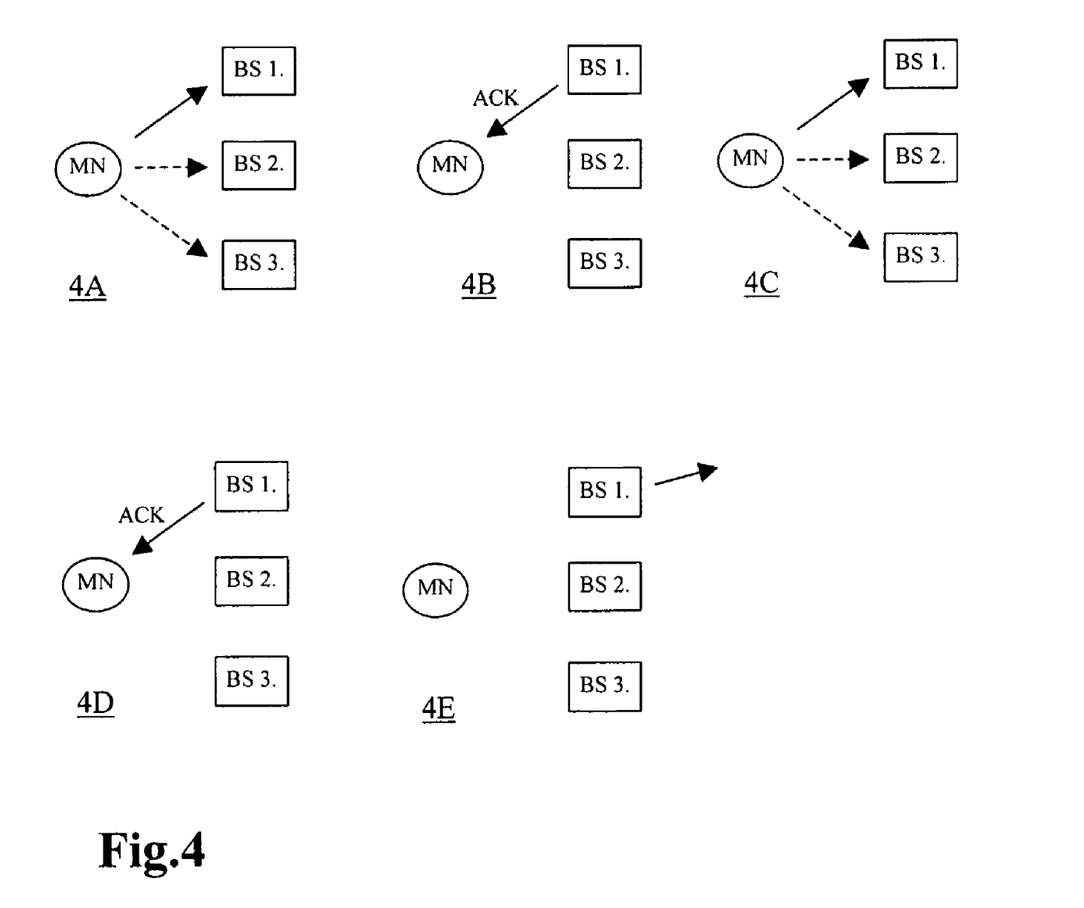
FIG. 4 is block diagrams corresponding to those in FIG. 1 however disclosing the signalling steps 4A-4E of an alternative method.

The steps 4A-4E of a method for transmitting segmented data packets from a mobile station MS to an a priori selected base station BS1-BS3 are described with reference to FIG. 4.

Initially the mobile station MS segments the next upper layer packet into two segments fitting into radio frames. The mobile station MS selects the first base station BS1 from the active set of base stations BS1-BS3 to be the receiver of the packet and it addresses the first radio frame to the selected BS when it is transmitted according to step 4A.

The other base stations BS2-BS3 that have not been addressed also listen to the radio frame and send back power control commands, which are used by the mobile station to make the radio link quality estimates that will be used when deciding which base station BS1-BS3 to be selected for a next upper layer packet to be transmitted. During transmission of radio frames related to one data packet, the mobile station MS regulates its output power according to the commands given by the selected first base station BS1 only.

In the next step 4B, the first base station BS1 sends ARQ feedbacks in the form of a positive acknowledgement of packet reception in the next radio frame to the mobile station MS. Other active set base stations BS2-BS3 that have not been addressed do not send ARQ.

The mobile station sends the next segment of the upper layer packet to the selected first base station BS1 in step 4C of the method, which is the last segment of the data packet in the example.

The first base station BS1 sends back positive acknowledgement in following step 4D. In case a negative acknowledgement is sent the mobile station MS retransmits the packet, addressed to the same base station BS1.

In the last step 4E of the transmission of the data packet, the first base station BS1 recognizes that the last segment of the upper layer packet has been received, it reassembles the packet and sends it further up into the network.

The a priori addressing of base station may preferably be made in the header of the frame containing the packet or segment.

In the disclosed examples on a priori selection, the radio link quality prediction is based on power control feedback possibly combined with other quality measures (e.g., ARQ, SIR) made on the reception on single packet previously transmitted from the mobile station. The prediction may well be made on such measures made over several consecutively transmitted packets.

General Remarks to the Examples Given

For the sake of increased understanding of the principles of the present invention the power commands sent from the active set base stations BS1-BS3 to the mobile station MS has been disclosed as being sent in response to each frame. It should however be noted that a power regulation command is sent with respect to each time slot on the radio link. A radio frame is transmitted over several time slots and accordingly the mobile station MS receives several power commands from each active set base station BS1-BS3 in respect of a transmitted radio frame. This does not affect the principles disclosed in the embodiments described.

Downlink Transmission

In the downlink all base stations BS1-BS3 within the active set transmit to the mobile station MS and the signals are maximum ratio combined in the mobile station MS. That is, basically there is no change compared to the existing soft handover solution. There should be some splitting node in the network that multicast the user data packets, e.g. the IP packets, to all base stations BS1-BS3 within the active set. The splitting may advantageously be done by a mobility anchor point, i.e. typically the uplink selection combining node in use when the present inventions is not applied.

The base stations BS1-BS3s should be synchronized, which can be ensured by some of the synchronization mechanism that is already employed in current cellular systems. The base stations BS1-BS3 segment the upper layer packets and send out the corresponding radio frames to the mobile station time synchronized. The mobile station MS combines the received signals, decodes the packet and based on whether the packet is error free or not it sends back a positive or negative acknowledgement. It needs to be ensured that the acknowledgement sent by the mobile station MS in the uplink can be safely received by all base stations BS1-BS3, even by those that are not part of the receiver set in the uplink. Therefore the acknowledgements have to be sent either on a separate control channel or they need to be better protected by coding etc., if they are sent piggy-backed on uplink user data.

If the acknowledgement sent by the mobile station MS in the uplink is interpreted differently by the base stations BS1-BS3 due to errors occurring independently on the radio links to the different base stations BS1-BS3, the downlink transmission of the base stations BS1-BS3 at the next radio frame will end up in a complete interference. Some base stations BS1-BS3 that have perceived a positive acknowledge will transmit the next radio frame, while others that have perceived a negative acknowledgement will retransmit the current frame. This results in a total interference of signals, which cannot be handled by the RAKE receiver in the mobile station. This situation should be avoided by appropriate protection of ARQ information. However, such a situation can not be precluded. If it happens, the mobile station MS will not be able to decode the downlink transmission, therefore it will keep sending negative acknowledgements in the uplink, which sooner or later will be correctly received by all base stations BS1-BS3. At this point all base stations BS1-BS3 will retransmit the packet and the packet level synchronization of downlink transmission will be restored.

Alternatively, downlink soft handover could be omitted. In this case the downlink base station could be the same as the uplink base station and only the selected base station transmits and receives to/from the mobile station MS. The uplink and downlink base station could alternatively be two different, in which case the mobile station MS could select from which base station it wants to receive the next downlink packet.

Mobile Station

Figure 5:
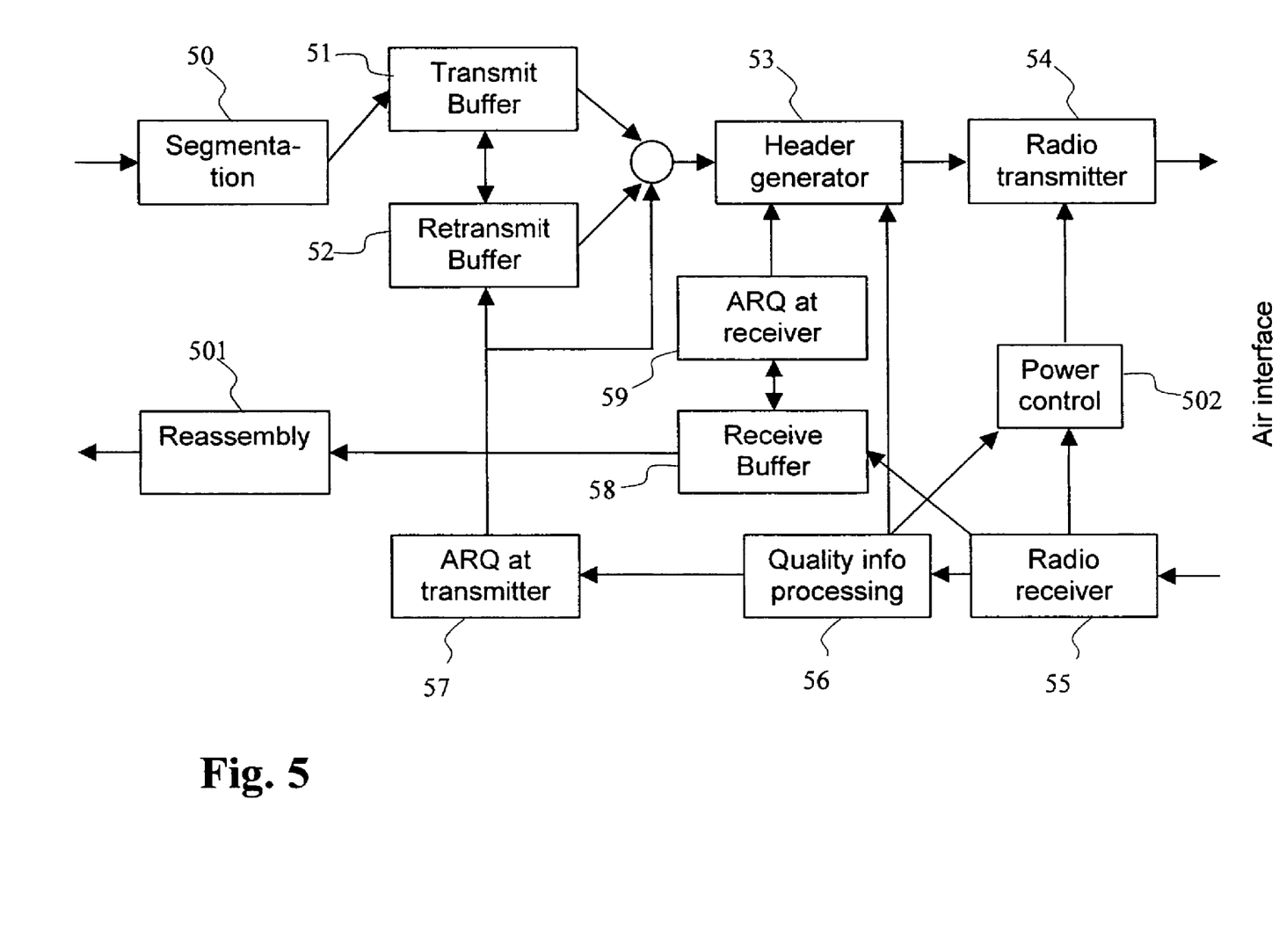
FIG. 5 is a block diagram of a mobile station structure.

FIG. 5 is a block diagram of the components essential for a mobile station MS modified for enabling the method of the present invention. For carrying out the method the mobile station MS also needs further structures, however, since they are common for mobile stations in general these structures has been left out for the sake of increased understanding of specifics of the invention.

At a transmitter side 50-54, 59 of the mobile station MS, a segmentation unit 50 receives incoming upper layer packets. The packets are first segmented, if being too long to fit into a radio frame, and put into a transmit buffer 51. The packet segments are scheduled for transmission on the radio frames. Before being sent by radio transmitter 54, the packet or segments passes header generator 53 and a header is added. Also, one copy of the segment is put into a retransmit buffer 52 for possible future retransmission.

In response to the uplink transmissions, the mobile station MS gets quality information from the base stations BS1-BS3. Radio receiver 55 receives the information for further processing at receiver side 55-58, 501.

Specifically, ARQ feedback information, i.e. acknowledgements, are forwarded from the radio receiver 55 to a transmitter side ARQ entity 57. Based on the ARQ feedback, some of the earlier segments may need to be retransmitted, which is controlled by the ARQ transmitter entity 57. Segments that are correctly received by a selected base station can be deleted from the retransmit buffer.

The selection of the base station is done in the quality info processor 56, which has an input from receiver 55 for receiving quality information, that preferably include the ARQ feedback information and transmit power commands and possibly signal to interference ratios reported by the base stations BS1-BS3. Quality info processing involves prediction of the best base station in case of a priori selection of base station.

The quality info processor 56 has an output to the header generator 53 for informing on the selected base station. Information on the selected base station is included in a header of at least one segment of the packet to be transmitted whether the selection is relevant for the packet being transmitted i.e. in the a priori selection case or be it relevant for a previously transmitted packet, i.e. the a posteriori selection.

The quality info processor 56 has a second output to a power control entity 502 that sets the transmit power. The power control is based on commands received from the one selected base station or from the receiver set base stations. Downlink streams of packet segments are received by radio receiver 55 and put into receiver buffer 58. ARQ at receiver Unit 59 has an input from the receiver buffer 58 and based on the reception state of the segments, an ARQ feedback is generated. Segments that have arrived correctly are forwarded to reassembly unit 501 and reassembled into packets.

The invention claimed is:

1. A method for a cellular mobile communications system, comprising the steps of:
   selecting an active set of base stations from a plurality of base stations, wherein each base station in said active set is capable of providing parallel radio links with a mobile station;
   transmitting a packet from the mobile station on a radio uplink;
   transmitting, from each of the base stations of the active set to the mobile station, a measure of the quality of the radio uplink made during receipt of said packet;
   selecting, by said mobile station, only one base station from the active set of base stations based upon said quality measures;
   transmitting information identifying the selected base station from the mobile station; and,
   forwarding the previously-received packet on a fixed link only from the selected base station.

2. The method according to claim 1, wherein all the active set base stations provide parallel radio downlinks to the mobile station.

3. The method of claim 1, wherein the measure of the radio uplink quality is an acknowledgement sent in response from one or more of the active set radio base stations upon said packet being received.

4. The method of claims 1, wherein the measure of the radio uplink quality is a transmitted power command.

5. The method of claim 1, wherein the measure of the radio link quality is a signal to interference ratio.

6. The method of claim 1, wherein the selecting step is made before transmission of said packet and the link quality predicting step is based on the measure received by the mobile station with respect to one or more packets transmitted previously to said packet.

7. The method according to claim 1, wherein said packet is segmented into two or more segments for transmission in subsequent radio frames and the selected base station reassembles the segments into said packet.

8. The method of claim 3, wherein one or more base stations that have positively acknowledged all previously transmitted segments of said packet are the only ones designated for reception of subsequent segments of said packet.

9. A mobile station for use in a cellular communications system, comprising:
   means for transmitting a packet to be received by two or more base stations;
   means for receiving a measure of radio link quality experienced by said two or more base stations during the data packet transmission;
   a posteriori selecting means for selecting, based upon said measures, only one of said base stations after said packet has been transmitted from the mobile station; or, alternatively, a priori selecting means comprising means for predicting the radio link quality and adapted for selecting only one of said base stations based on prediction of said radio link qualities before said packet is transmitted; and,
   means for transmitting uplink information identifying said one of the active set base stations that is selected for the packet to be forwarded on a fixed link by the selected base station.

10. The mobile station of claim 9, further comprising means for receiving packets transmitted from two or more radio base stations in parallel and combining the packets.

11. The mobile station of claim 10, wherein said combining is maximum ratio combining.

12. The mobile station of claim 9, wherein said measure of radio link quality is one or more acknowledgements on the receipt of the transmitted packets.

13. The mobile station of claim 9, wherein said measure of radio link quality is a transmit power command received from said base stations.

14. The mobile station of claim 9, wherein said measure of radio link quality is a signal to interference ratio.

15. The mobile station of claim 9, further comprising means for segmenting the packet into segments fitting into radio blocks.

16. The mobile station of claim 15, as dependent on the a posteriori selection, wherein the mobile station power control is controlled by power commands received only from one or more of said base stations that have reported positive acknowledgements with respect to the transmitted segments of the relevant packet.

17. The mobile station of claim 9, adapted for transmitting the information on the priori selected base station with the relevant packet.

18. The mobile station of claim 9, wherein said prediction means uses a measure of radio link quality received in response to one or more previously transmitted packets.

19. The mobile station of claim 9, operative to adjust its output power to the commands received from the a priori selected base station only.

20. A base station having means to receive a packet from a mobile station and means to send an acknowledgement to the mobile station in response to the received packet, said base station comprising:
   means for detecting information from the mobile station that identifies a specific base station selected by said mobile station for forwarding said received packet; and,
   means for selectively forwarding the received packet further in a connected radio network only when said detecting means detects that the base station is identified as being selected by said mobile station.

21. The base station of claim 20, adapted for receiving said information subsequent to the packet being received by the MS.

22. The base station of claim 20, adapted for receiving said information with said packet.

23. The base station of claim 20, wherein the detection means are adapted for receiving the selection information on a packet-by-packet basis.

24. The base station of claim 20, further comprising means for timing downlink transmission of radio frames by use of a synchronisation signal received via an interface to a fixed part of the network for parallel transmission of radio frames from all base stations of an active set.

* * * * *